Figure 1:
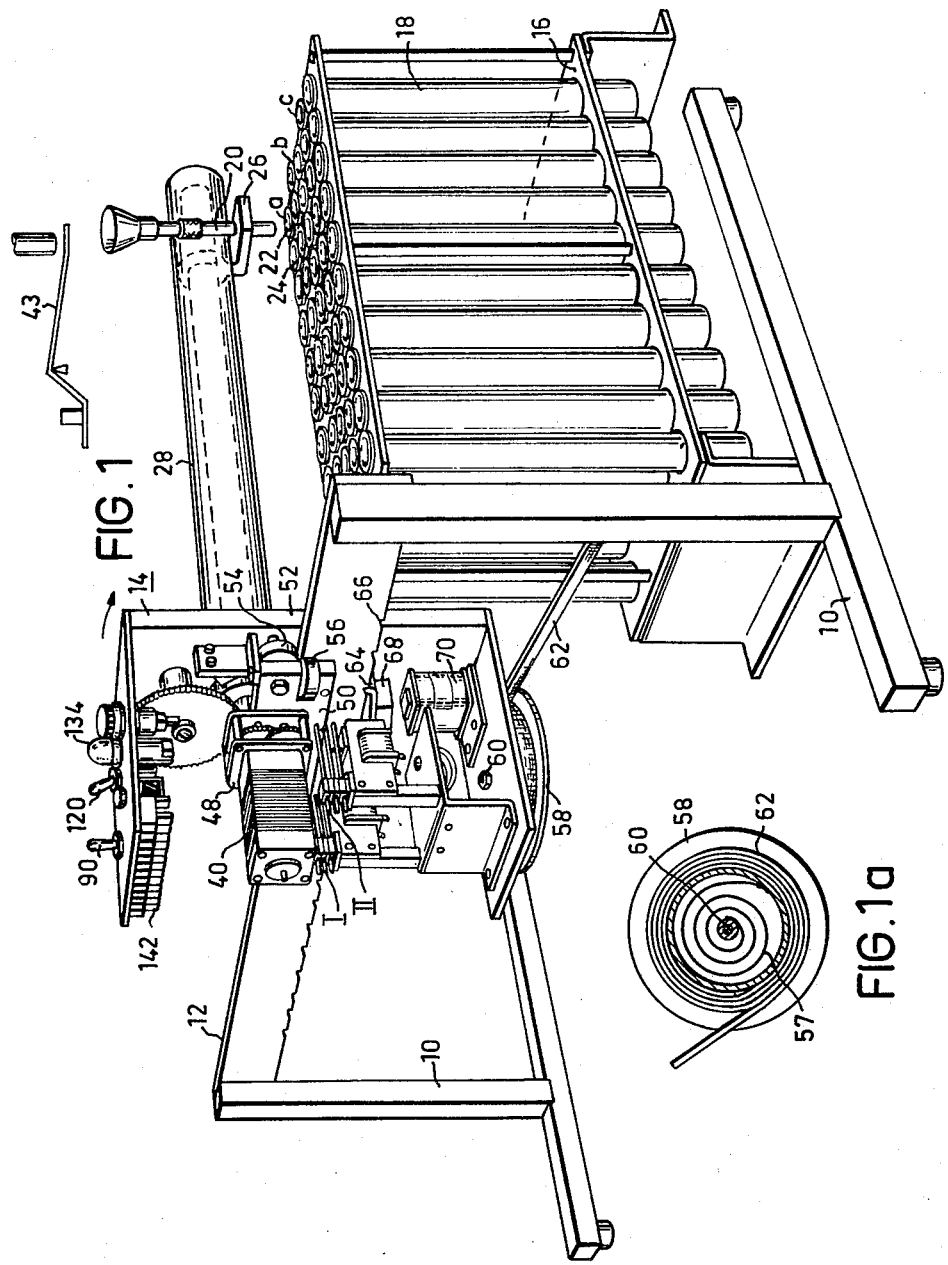

Aug. 9, 1966

S. E. HOLM ETAL 3,265,100

APPARATUS FOR SUPPLYING QUANTITIES OF MATERIAL
TO A PLURALITY OF RECEPTACLES

Filed May 13, 1963

3 Sheets-Sheet 1

INVENTORS
SUNE ERIK HOLM
BY EDGAR ANSELM EKLUND

Young & Thompson
ATTYS

Aug. 9, 1966 S. E. HOLM ETAL 3,265,100
APPARATUS FOR SUPPLYING QUANTITIES OF MATERIAL
TO A PLURALITY OF RECEPTACLES
Filed May 13, 1963 3 Sheets-Sheet 3

INVENTORS
SUNE ERIK HOLM
BY EDGAR ANSELM EKLUND
By Young & Thompson
ATTYS.

United States Patent Office 3,265,100
Patented August 9, 1966

1

3,265,100
APPARATUS FOR SUPPLYING QUANTITIES OF MATERIAL TO A PLURALITY OF RECEPTACLES
Sune Erik Holm, Vallingby, and Edgar Anselm Eklund, Bomhus, Sweden, assignors to AB D. J. Stork, Stockholm, Sweden, a corporation of Sweden
Filed May 13, 1963, Ser. No. 280,025
Claims priority, application Sweden, May 17, 1962, 5,562/62
5 Claims. (Cl. 141—284)

This invention relates to an apparatus for supplying quantities of material, for instance liquid or powdery material, by means of a stepwise displaceable supply member to receptacles such as test tubes, arranged in rows. In previously known apparatuses of this kind the test tubes have been placed in a circular stand where they are arranged in a plurality of concentric circular rows with the receptacles in close juxtaposition. This stand has been rotatable and liquid has been supplied to each of the receptacles by means of a liquid supply mechanism the discharge opening of which has been successively positioned above each of the receptacles of the circular rows. Because of the fact that both the stand and the supply mechanism of this known apparatus are movable and adjusted stepwise in predetermined relation to each other during the driving mechanism is rather complicated and the apparatus is inconvenient in use. The object of this invention is to avoid these inconveniences and to constitute the apparatus in a manner such that the receptacles can be stationary not only during the charging operation, but also during the intermittent movement of the supply member from one receptacle to another.

In its broadest aspect the invention is characterized in that it comprises a driving member which is rectilinearly movable in two directions making an angle with each other for successively displacing the supply member to the supplying positions. In such an apparatus the stand can be of very simple construction due to the fact that the receptacles can be arranged in straight rows disposed near each other. According to a very simple construction the supply member is movable along a row of receptacles to successive material-supplying positions in said row and is then displaced to the next row by movement transversely of the rows. In this case a simple driving mechanism can be used because a constant speed can be applied to move the supply member from one receptacle to another in each individual row, and displacement from one row to another can also be effected by simple means.

According to a simple embodiment the apparatus comprises a continuous conveying member, preferably a screw having an endless thread and a slide cooperating therewith, for moving the supply member along each of the rows, and a spring member associated with a detent for moving the supply member from row to row, said detent being adapted to permit intermittent movements of a support carrying the supply member and actuated by said spring member in order to move the support a distance corresponding to the spacing of the rows. The movements of the continuous conveying member and the detent may be timed so as automatically to displace the supply member from receptacle to receptacle of each row and from one row to another row until all of the receptacles have received a predetermined quantity of material. In this way it is possible to charge all of the receptacles rapidly and conveniently with the desired quantity of material

2 in successive operation without the need of any manual action except for starting the apparatus. Nevertheless, the apparatus may be provided with means for alternative manual adjustment of the supply member from one receptacle to another one.

Additional features of the invention an advantages obtained thereby will appear from the following description of an embodiment illustrated in the annexed drawing.

Figure 2:
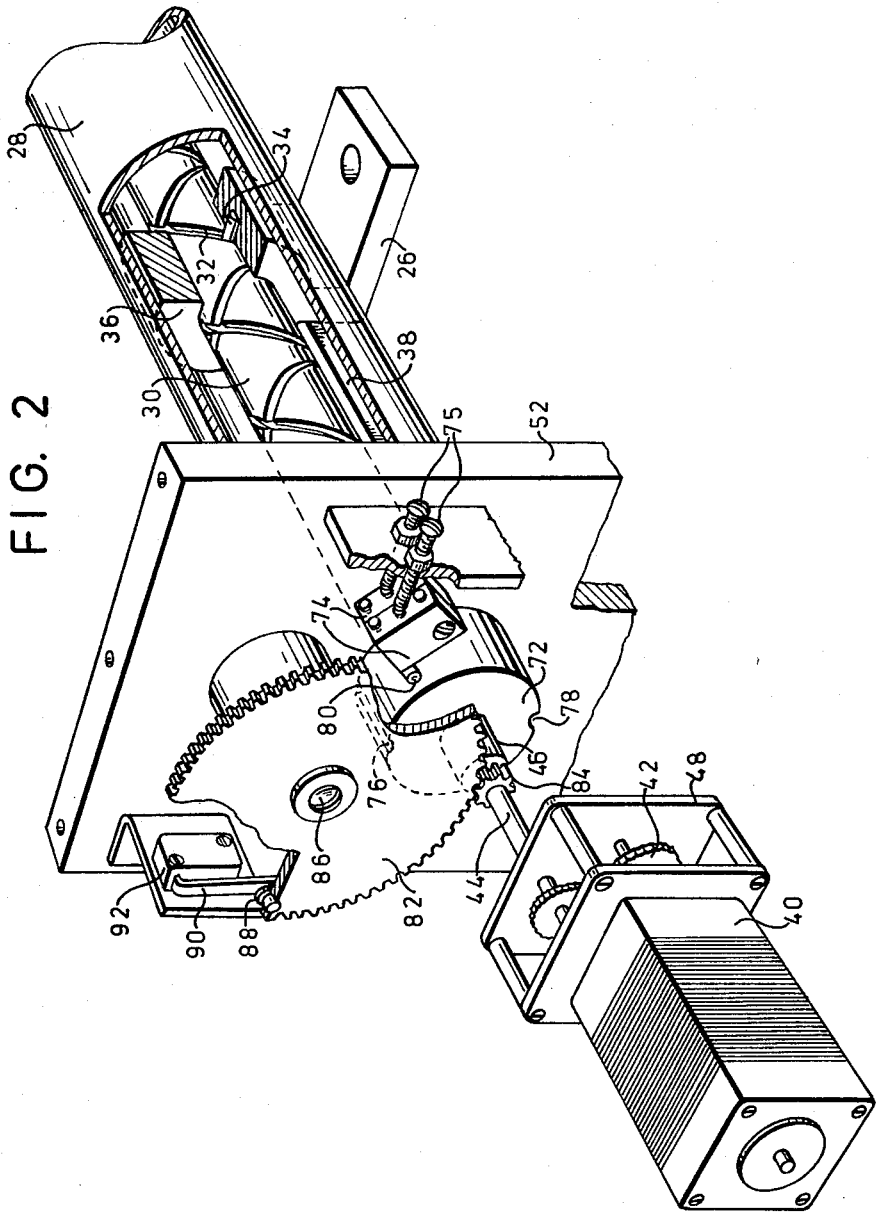
Figure 3:
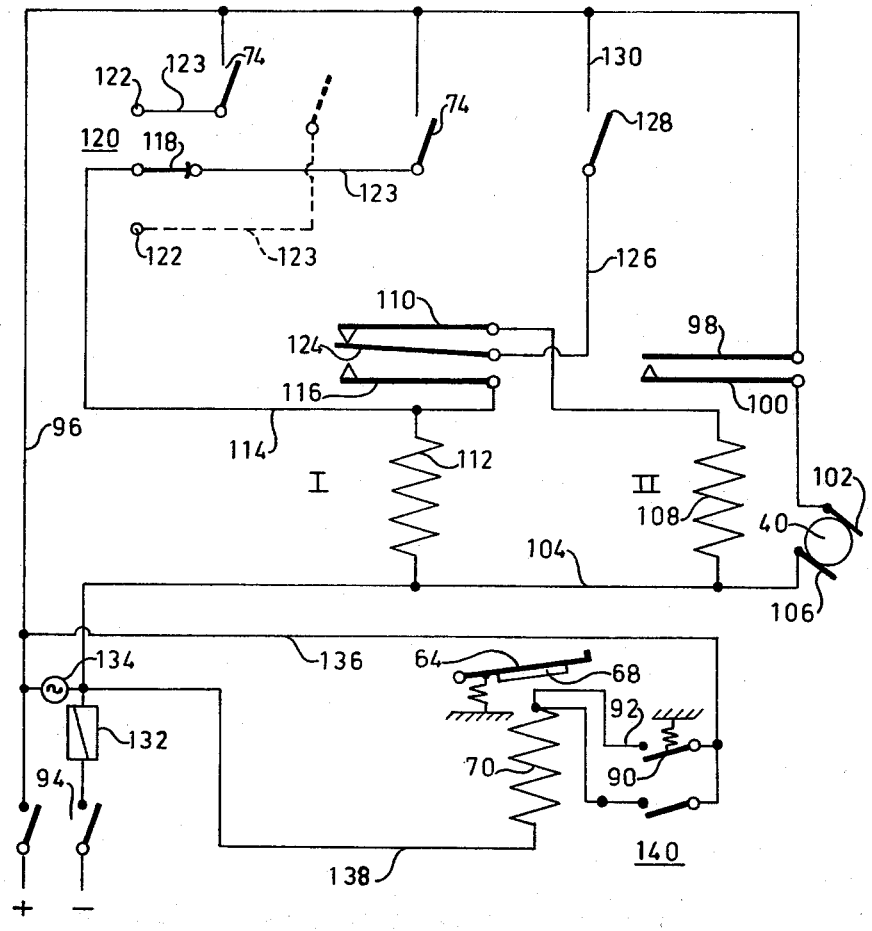

FIG. 1 is a perspective view of the entire apparatus except for the casing of the driving mechanism which is removed to expose the parts contained therein. FIG. 1a is a fragmentary cross-sectional view from above, of the spring means for driving the device. FIG. 2 is a perspective view of an enlarged scale of the main parts of the mechanism for moving the supply member along each row of receptacles. FIG. 3 illustrates a wiring diagram.

Generally the apparatus comprises a frame 10 having a horizontal rail 12, a carriage 14 supported by the rail and consisting of a box containing driving means and electric equipment, and a stand 16 for receptacles in the form of test tubes 18 which are arranged in rows in the stand. The apparatus is intended to move a supply member in the form of a tube 20 for instance from a position above a first test tube 22 of a row $a$ of such tubes to the next test tube 24 of the same row and so on to all of the test tubes of this row and then to move the supply member to the adjacent row $b$ along which the supply member is moved in the opposite direction, and so on until all of the test tubes of all of the rows have received the desired quantity of material from the supply member.

In order to render possible the above named movements the supply member is carried by a slide 26 of a continuously operating conveying member which in turn is carried by the carriage 14. The slide 26 is movable along a horizontal tube 28 carried by the carriage 14 which in turn is movable along the rail 12 of the frame 10 which rail extends at right angles to the tube 28.

As will be seen from FIG. 2 the tube 28 houses a screw 30 mounted in the tube and having an endless thread 32 in engagement with a pin 34. The pin 34 is secured in a sleeve 36 which surrounds the screw and forms part of the slide 26 which is in the form of an angular plate. One leg of said plate extends outwards from the sleeve 36 through a longitudinal slot 38 of the tube 28. Upon revolution of the screw 30 the slide 26, due to the engagement of the pin 34 with the thread 32, is moved along the screw from one end to the other end thereof. At the ends of the screw the slide turns and moves back in the opposite direction.

The screw 30 is rotated by an electric motor 40 and a change gear 42 having an output shaft 44 which is connected to a central pin 46 at one end of the screw 30. The change gear 42 is housed in a gear box 48 secured to a plate 50 which is attached to the front wall 52 of the casing in which the main parts of the apparatus are enclosed and which form the carriage 14. The carriage 14 is guided along the rail 12 by means of rollers 54 and 56 which are mounted on shafts extending at right angles to each other. A pair of rollers 54 (only one roller of this pair being shown in FIG. 1) runs on the top side of the rail 12 whereas another pair of rollers 56 bears on the front and rear side of the rail. Due to this arrangement the carriage 14 is easily movable along the rail 12. For moving the carriage 14 step by step along the rail there are provided a spring mechanism and a detent. The spring mechanism is shown in FIGS. 1 and 1a and comprises a clock spring 57 which is provided in a strip reel 58 and tends to turn the reel in a certain direction about a shaft 60. Wound onto the reel is a strip 62 one end of which is connected to the frame 10. The detent consists of a spring-actuated pawl 64 which under the action of the spring is maintained in engagement with the lower side of the rail 12. This lower side has a plurality of notches 66 and the distances between the notches correspond to the distances between the rows a, b, c of test tubes in the stand 16. Connected to the pawl 64 is an armature 68 in opposite relation to the core of an electromagnet 70. Upon excitation of the electromagnet the armature 68 will be attracted and the pawl 64 will be temporarily moved out of engagement with the corresponding notch so that the spring mechanism can pull the carriage one step to the right as viewed in FIG. 1.

As long as the electromotor 40 is energized it revolves the screw 30 continuously via the change gear 42 and the shaft 44. However, in order to arrest the slide 26 and the supply member 20 in correct position above each test tube of the respective row, the motor 40 is stopped in corresponding positions. To this end switches connected in the circuit of the motor are actuated in response to the rotation of the shaft 44 and screw 30. In the embodiment illustrated the pin 46 of the screw 30 has keyed on it a timing disc 72 the circumference of which is in engagement with a plurality of switches 74. Each of these switches may consist of a microswitch adjustable by means of a set screw 75. The switches are intended one at a time to be connected in circuit with the motor 40 and they may be actuated in different manners by the timing disc 72. In the embodiment illustrated the circumference of the timing disc 72 has two axial grooves 76, 78. The grooves are disposed in diametrically opposite positions and intended to cooperate with projections or rolls 80 by means of which the switches 74 individually cooperate with the circumference of the timing disc 72. One groove 76 is sufficiently long to be engaged by the rolls 80 of both switches whereas the other groove 78 is shorter and located such that it can receive the roll 80 of one of the switches 74 only. When during rotation of the timing disc a roll 80 passes a groove the corresponding switch is moved and temporarily interrupts the current to the motor 40. If one of the switches is in circuit the current is interrupted twice per revolution namely, each time the roll 80 of this switch enters the grooves 76 and 78 whereas the current is interrupted once per revolution if the other switch is in circuit with the motor. Consequently, in the former case the slide 26 and the supply member 20 will be moved between each interruption of the current through a distance which is half the distance of the movement in the latter case. It will be obvious that by the provision of a suitable number of switches and grooves in the timing disc steps of movements of desired lengths are obtainable.

In addition to the described first timing disc 72 there is provided a second timing disc in the form of a large gear wheel 82 which determines the displacement of the carriage along the rail 12. The gear wheel 82 is in mesh with a pinion 84 keyed onto the shaft 44. The gear ratio is chosen such that for each revolution of the gear wheel 82 about its shaft 86 the pinion 84 makes as many revolutions as are required for moving the slide 36 by means of the screw 30 from one end of a row of test tubes to the other end of the same row. The second timing disc 82 carries a pin 88 which once for each revolution engages a resilient contact arm 90 of a switch 92 which at that time closes a circuit through the electromagnet 70 of the detent 64 whereby the armature 68 of the detent will be attracted by the electromagnet and the pawl will be temporarily disengaged so that the carriage 14 can move one step.

As will appear from the wiring diagram illustrated in FIG. 3 the electric system of the apparatus can be connected to a source of current by means of a manually operable switch 94. The positive terminal of the source of current is connectible through a wire 96 and a pair of normally open contacts 98, 100 of a relay to one terminal 102 of the driving motor 40, and the negative terminal of the source of current is connected through a wire 104 to the other terminal 106 of the motor. The relay provided with the contacts 98, 100 comprises a magnet coil 108 disposed between the wire 104 and a fixed contact 110 of a relay having a magnet coil 112 disposed between the wire 104 and a wire 114 which leads from a second fixed contact 116 of the last named relay to an adjustable contact arm 118 of a change-over switch 120 (see also FIG. 1) having a plurality of fixed contacts 122 which through wires 123 are individually connected to the corresponding switches 74. Two such swtiches corresponding to the switches shown in FIG. 2 are indicated by full lines in the wiring diagram. A third switch is indicated by broken lines to show that further switches and corresponding contacts 122 of the change-over switch may be provided. The relay 112 has an intermediate relay spring 124 which in the de-energized condition of the relay engages the fixed contact 110 and upon excitation is attracted and engages the fixed contact 116. Through a wire 126 the intermedite contact 124 is connected to one terminal of an impulse member 128 illustrated in the form of a switch the other terminal of which is connected to the wire 96 by means of a wire 130. The impulse member 128 is adapted to be actuated by a measuring device, such as a weighing instrument, which measures the quantity of material to be supplied to each test tube. The change-over switch 120 is manually operable for selectively putting either of the switches 74 actuated by the timing disc 72 in "on" position. The wiring diagram further shows a fuse 132 and an indicator lamp 134 which is lighted when current flows through the apparatus.

Connected in parallel with the motor 40 and the wires 96–104 by means of wires 136–138 is the coil of the electromagnet 70 the armature 68 of which is provided with the pawl 64 which in cooperation with the notches 66 controls the intermittent movement of the carriage 14 along the rail 12. Connected in series with the coil of the electromagnet 70 is the switch 92 the contact arm 90 of which is acted upon by the timing disc 82 (FIG. 2). The pin 88 of this disc acts upon the contact arm 90 and thereby automatically permits the carriage 14 to move one step. In parallel relation to the contacts 90, 92 there may be provided a switch 140 which permits movement of the carriage 14 by manual action so as to close the circuit across the coil of the magnet 70.

Except for the electric wires the parts of the wiring diagram correspond to similar parts shown in FIG. 1 where the same reference numerals are employed as in the wiring diagram. Below the line switch 94 in FIG. 1 there is shown a connection terminal board 142 which facilitates joining of the various wires in the circuit.

In the following description of the mode of operation of the apparatus the relay provided with the magnet coil 112 is designated I and the relay provided with the coil 108 is designated II. The measuring or dosing device, illustrated as a weighing instrument 143 in FIG. 1, which measures the desired quantity of material for each test tube and admits the material to the supply tube 20, actuates the impulse member 128 and closes the circuit across this member each time a test tube has been charged. Current flows then from the positive terminal of the source of current through the wires 96 and 130, the impulse member 128, wire 126, intermediate contact 124 of the relay I, fixed contact 110 of this relay magnet coil 108 of the relay II, wire 104 and fuse 132 to the negative terminal of the source of current. As a result the relay II will be energized and the contact 98 thereof will be attracted to the fixed contact 100 and a circuit will be completed from the positive terminal of the source of current through wire 96, terminal 102 of the motor, terminal 106 of the motor and wire 104 to the negative terminal of the source of current. Consequently, the motor 40 will be started and turn the screw 30 through the change gear 42. At the same time the timing disc 72 keyed onto the pin 46 is turned by the pinion 84. After the timing disc has been turned so far that the groove, for instance the groove 76, has come in registry with the roll 80 of a switch 74 and this roll passes the groove, the switch 74 which at that time is connected in circuit by means of the change-over switch 120 will complete the circuit from the positive terminal of the source of current through wire 96, change-over switch, wire 114, coil 112 of relay I and wire 104 to the negative terminal of the source of current. The intermediate contact 124 of the relay I will be attracted and interrupt the current through the coil 108 of the relay II and engage the fixed contact 116. As a result, the second relay interrupts the current to the motor 40 which comes to a rest. It will be seen that the screw 30 will remain in a position determined by the position of the groove 76 in the timing disc 72. However, should the timing disc 72 stop just when the roll 80 of the switch 74 engages the groove 76 the motor could not be started again by an impulse from the impulse member 128. In order to render possible renewed automatic start by means of the impulse member 128 the masses of the timing disc 72 and the parts rotating therewith are chosen such that the timing disc 72 due to the kinetic energy of the disc and said parts will continue to rotate after interruption of the current to the motor 40 until the roll 80 of the switch 74 has just passed beyond the groove 76. Then the current through the relay I is interrupted again by the switch 74 and the intermediate contact of this relay returns to the contact 110. Now the various switch members have resumed their initial positions and the sequence of operation described can be repeated by an impulse from the impulse member 128. Such impulse is given after charging the test tube above which the supply tube 20 is located on that occasion.

In the embodiment exemplified where the stand 16 holds ten test tubes in each row the other timing disc or gear wheel 82 makes a single revolution while the shaft 44 and the screw 30 are making ten revolutions. After these revolutions have been completed the pin 88 of the timing disc 82 acts upon the contact arm 90 and closes the switch 92 thereby completing a circuit from the positive terminal of the source of current through wire 96, wire 136, switch 90, 92, coil of electromagnet 70 and wire 138 to the negative terminal of the source of current. As a result, the armature 68 is attracted and the pawl 64 is withdrawn from the notch 66 which is engaged by the pawl on that occasion. Now the carriage 14 is released and can be moved one step to the right in FIG. 1 by means of the spring-actuated reel 58 and the strip 62. However, the resilient contact arm 90 recoils as soon as the pin 88 has passed beyond this arm, resulting in that the current through the coil 70 in interrupted again and that the spring-actuated pawl 64 can be moved back by the action of the spring into engagement with the lower side of the rail 12. Then the pawl 64 engages the next notch 66 of the rail so that the carriage 14 can be displaced one step only and the supply tube 20 will be in position right above the first test tube of the next row. The sequence of operations is repeated until the test tubes of all rows have been supplied with material.

If manual control of the displacement along each row is desired the impulse member 128 is used as a manually operable switch, and movement of the carriage 14 from one row to another can be manually controlled by means of the switch 140.

The invention is not limited to the details illustrated by way of example only. For instance the construction of the timing discs may be modified in various manners. The grooves 76 and 78 of the timing disc 72 may be replaced by projections or cams acting upon the switches 74. Further the apparatus may be modified for charging any desired number of receptacles arranged in rows making an angle with each other. The angle between the rows need not be a right one because the screw 30 may make an angle other than a right one with the rail 12.

What is claimed is:

1. An apparatus for supplying quantities of material to receptacles located in rectilinear rows, comprising a frame including a rail having stop means, a support mounted on said rail for movement therealong, a detent for determining definite positions of said support on said rail in cooperation with said stop means, spring means adapted to move said support along the rails after release of the detent, conveying means mounted on said support, a supply unit driven by the conveying means in a direction at right angles to said rail to respective positions above each receptacle in a row, said supply unit comprising a material-supplying device for controlling the supply through the supply member and initiating the displacement thereof by the conveying means, an electric circuit including a circuit-closing device, a first relay, a second relay, and a driving motor for the continuous conveying member, the circuit-closing device being adapted to provide a long impulse through contacts of said first relay via contacts of said second relay to complete the circuit of said driving motor on actuation of the circuit-closing device by the measuring device, a timing disc operatingly connected with said driving motor to close an exciting circuit of said first relay whereby to open the previously closed exciting circuit of the second relay after movement of the supply member one step from a receptacle of a row to the next receptacle of the same row.

2. An apparatus as claimed in claim 1, in which said electric circuit comprises a detent-actuating electromagnet coupled in parallel to the first relay and the second relay, a switch being coupled in series with said electromagnet, a second timing disc adapted to actuate said switch and operatively connected to the motor, a change gear mounted between said motor and said second timing disc to enable rotation of the latter at a speed being a fraction of that of the first-named timing disc, said second timing disc being adapted to switch in the electromagnet for actuating the detent as soon as a row of receptacles has been charged with material.

3. An apparatus as claimed in claim 2 and further comprising a manually operable switch in parallel with the switch coupled in series with said electromagnet.

4. An apparatus for supplying quantities of material to receptacles located in rows, comprising a support, conveying means carried by said support, a supply member to be moved rectilinearly in one direction by said conveying means, a frame comprising a straight guide rail extending at right angles to said direction and adapted to guide and carry said support, said rail being provided with notches, spring means adapted to move said support along said rail, a detent mounted on said support to define, in cooperation with said notches, positions for the supply member above respective rows of receptacles and means to drive said conveying means to set the supply member successively in positions for supplying material to each receptacle in each row, said conveying means comprising a rotary screw having an endless screw thread and further comprising a slide in engagement with said screw thread, said screw being mounted in a tube provided with a longitudinal slot engaged by the slide, the slide carrying the supply member to move it longitudinally of the tube in one direction and back in the opposite direction as the screw rotates in one direction only.

5. Apparatus for supplying quantities of material to receptacles in rows, comprising a supply member, first guide means, a rotary screw, said screw comprising an endless screw thread for moving the supply member in one direction and back in the opposite direction as the screw rotates in one direction only to set the supply member along a row of receptacles to successive material-supplying positions, second guide means, and means for moving said first guide means along said second guide means transversely of said first row of receptacles to position said supply member opposite a second row of receptacles.

References Cited by the Examiner

UNITED STATES PATENTS

| | | | |
|---|---|---|---|
| 624,335 | 5/1899 | Hucks | 141—232 X |
| 833,988 | 10/1906 | Valerius | 141—250 |
| 1,740,032 | 12/1929 | Pecard | 141—233 |
| 2,894,542 | 7/1959 | Alm | 141—130 X |
| 2,975,809 | 3/1961 | Ninneman et al. | 141—266 X |
| 3,168,124 | 2/1965 | Lenkey | 141—130 X |

FOREIGN PATENTS 45,166  1/1932  Denmark.

LAVERNE D. GEIGER, *Primary Examiner.*

H. BELL, *Assistant Examiner.*